(12) United States Patent
Yamada et al.

(10) Patent No.: US 8,423,263 B2
(45) Date of Patent: Apr. 16, 2013

(54) FUEL INJECTION DETECTING DEVICE

(75) Inventors: Naoyuki Yamada, Kariya (JP); Koji Ishizuka, Chita-gun (JP)

(73) Assignee: Denso Corporation, Kariya (JP)

( * ) Notice: Subject to any disclaimer, the term of this patent is extended or adjusted under 35 U.S.C. 154(b) by 448 days.

(21) Appl. No.: 12/731,412

(22) Filed: Mar. 25, 2010

(65) Prior Publication Data
US 2010/0250096 A1 Sep. 30, 2010

(30) Foreign Application Priority Data
Mar. 25, 2009 (JP) .................................. 2009-74280

(51) Int. Cl.
*F02D 41/30* (2006.01)
*F02M 63/00* (2006.01)

(52) U.S. Cl.
USPC .......................................... 701/103; 123/447

(58) Field of Classification Search .......... 123/299–305, 123/445–448, 472, 478–481, 456, 486, 494, 123/568.11, 568.26; 701/103–105
See application file for complete search history.

(56) References Cited

U.S. PATENT DOCUMENTS

| | | | |
|---|---|---|---|
| 6,102,009 A | 8/2000 | Nishiyama | |
| 7,000,600 B1* | 2/2006 | Yamada et al. | 123/501 |
| 7,500,471 B2 | 3/2009 | Adachi et al. | |
| 7,677,092 B2* | 3/2010 | Ishizuka et al. | 73/114.45 |
| 7,747,377 B2* | 6/2010 | Nakata et al. | 701/103 |
| 7,765,995 B2 | 8/2010 | Nakata et al. | |
| 7,792,632 B2* | 9/2010 | Ishizuka et al. | 701/109 |
| 2002/0092504 A1* | 7/2002 | Kohketsu et al. | 123/447 |
| 2003/0159678 A1* | 8/2003 | Egler et al. | 123/447 |
| 2008/0228374 A1 | 9/2008 | Ishizuka et al. | |
| 2009/0063010 A1* | 3/2009 | Nakata et al. | 701/103 |
| 2009/0063013 A1* | 3/2009 | Nakata et al. | 701/103 |
| 2009/0063016 A1* | 3/2009 | Nakata et al. | 701/103 |
| 2009/0319157 A1* | 12/2009 | Ishizuka | 701/106 |
| 2009/0326788 A1* | 12/2009 | Yuasa et al. | 701/104 |

FOREIGN PATENT DOCUMENTS

| | | |
|---|---|---|
| JP | 10-047137 | 2/1998 |
| JP | 2000-257495 | 9/2000 |
| JP | 2000-265892 | 9/2000 |
| JP | 2001-065397 | 3/2001 |

OTHER PUBLICATIONS

Japanese Office Action dated Mar. 1, 2011, issued in corresponding Japanese Application No. 2009-074280 with English Translation.
U.S. Appl. No. 12/731,401, filed Mar. 25, 2010, Yamada et al.
U.S. Appl. No. 12/731,431, filed Mar. 25, 2010, Yamada et al.
U.S. Appl. No. 12/731,444, filed Mar. 25, 2010, Imai et al.
Office Action (11 pgs.) dated Aug. 14, 2012 issued in co-pending U.S. Appl. No. 12/731,444.
Office Action (7 pgs.) dated Sep. 5, 2012 issued in corresponding Chinese Patent Application No. 201010149171.2 with an at least partial English-language translation thereof.

* cited by examiner

*Primary Examiner* — John Kwon
*Assistant Examiner* — Johnny Hoang
(74) *Attorney, Agent, or Firm* — Nixon & Vanderhye P.C.

(57) ABSTRACT

A fuel injection detecting device computes an actual fuel-injection-start timing based on a falling waveform of the fuel pressure detected by a fuel sensor during a period in which the fuel pressure decreases due to a fuel injection rate increase. The falling waveform is modeled by a modeling formula. A reference pressure is substituted into the modeling formula, whereby a timing is obtained as the fuel-injection-start timing.

11 Claims, 9 Drawing Sheets

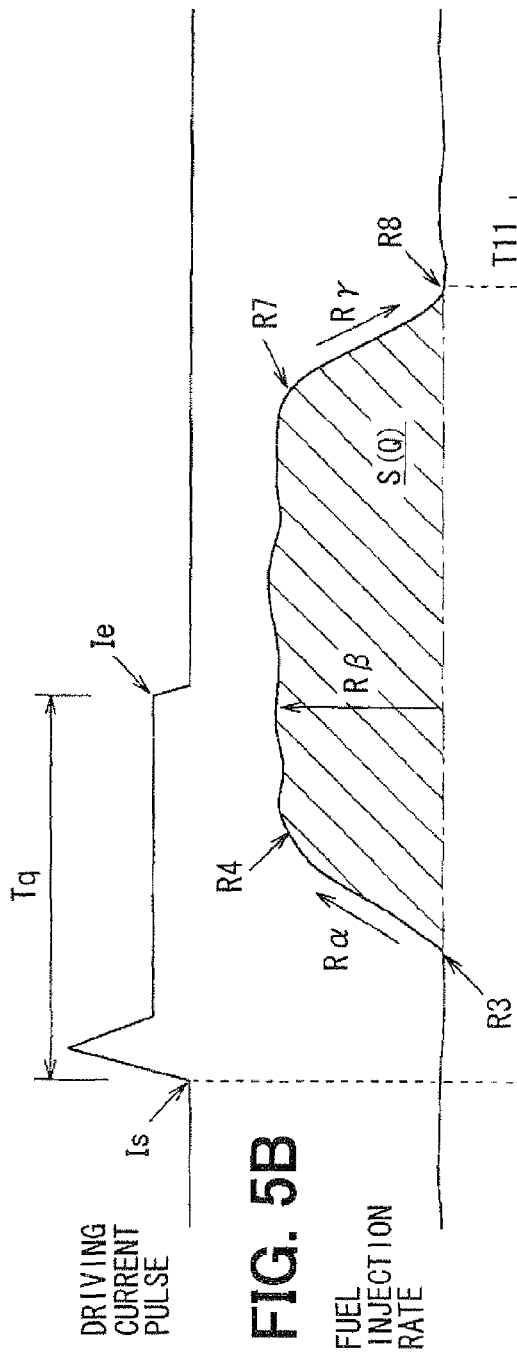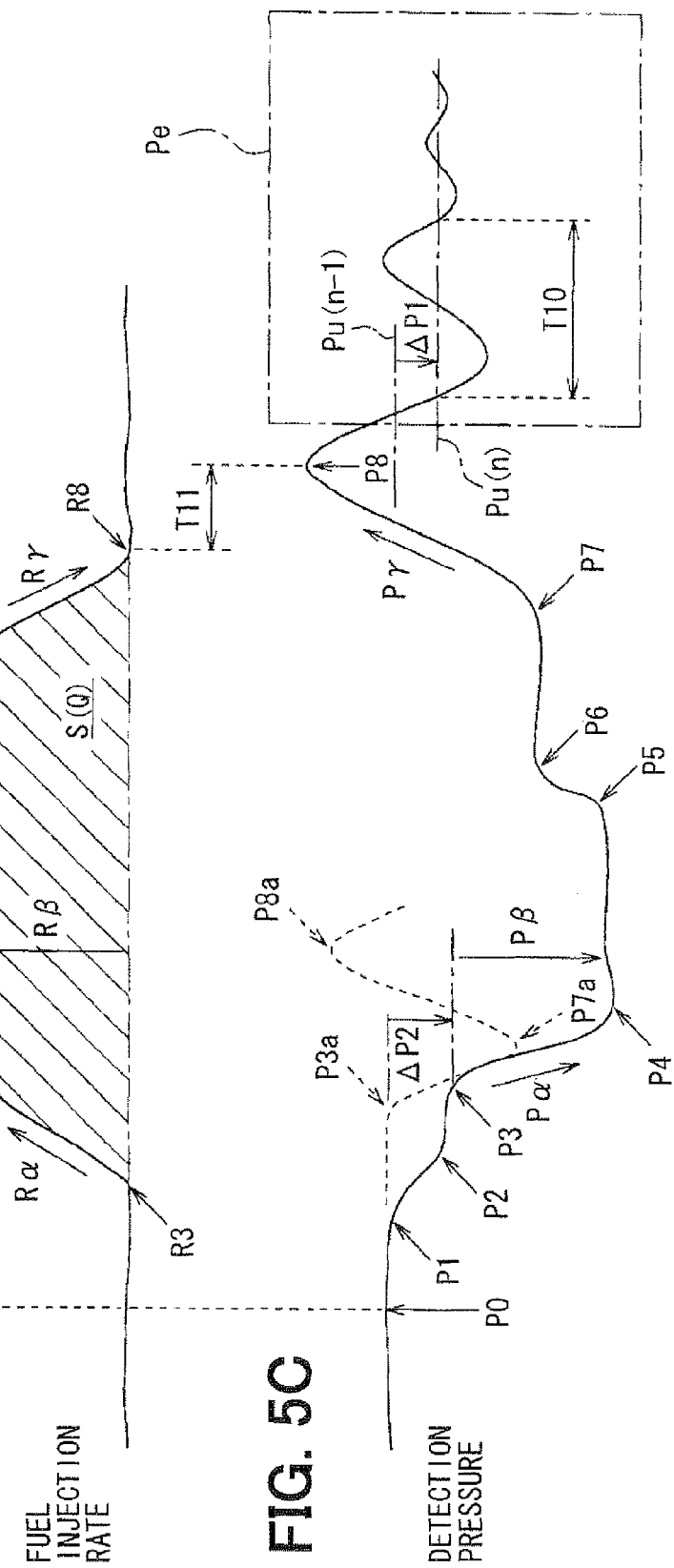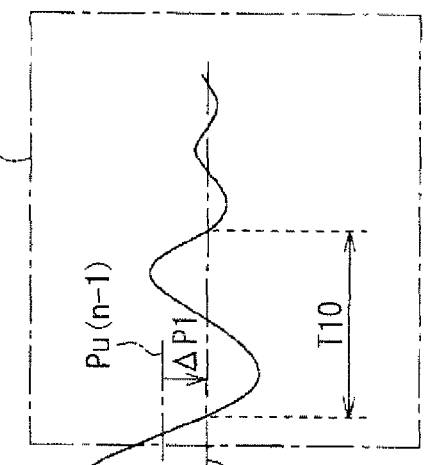

DRIVING CURRENT PULSE

FUEL PRESSURE

DRIVING CURRENT PULSE

FUEL PRESSURE

DRIVING CURRENT PULSE

FUEL PRESSURE

DRIVING CURRENT PULSE

FUEL PRESSURE

FUEL INJECTION DETECTING DEVICE

CROSS-REFERENCE TO RELATED APPLICATION

This application is based on Japanese Patent Application No. 2009-74280 filed on Mar. 25, 2009, the disclosure of which is incorporated herein by reference.

FIELD OF THE INVENTION

The present invention relates to a fuel injection detecting device which detects fuel injection condition.

BACKGROUND OF THE INVENTION

It is important to detect a fuel injection condition, such as a fuel-injection-start timing, a fuel injection quantity and the like in order to accurately control an output torque and an emission of an internal combustion engine. Conventionally, it is known that an actual fuel injection condition is detected by sensing a fuel pressure in a fuel injection system, which is varied due to a fuel injection.

For example, JP-2008-144749A (US-2008-0228374A1) describes that an actual fuel-injection-start timing is detected by detecting a timing at which the fuel pressure in the fuel injection system starts to be decreased due to a start of the fuel injection and the fuel-injection-end timing is detected by detecting a timing at which the fuel pressure increase is stopped.

A fuel pressure sensor disposed in a common rail hardly detects a variation in the fuel pressure with high accuracy because the fuel pressure variation due to the fuel injection is attenuated in the common rail. JP-2008-144749A and JP-2000-265892A describe that a fuel pressure sensor is disposed in a fuel injector to detect the variation in the fuel pressure before the variation is attenuated in the common rail.

JP-2008-144749A shows a method of computing the fuel-injection-start timing based on a pressure waveform detected by the pressure sensor disposed in a fuel injector, which method will be described hereinafter.

As shown in FIG. 13A, when a command signal for starting a fuel injection is outputted from an electronic control unit (ECU) at a fuel-injection-start command timing "Is", a driving current supplied from an electronic driver unit (EDU) to a fuel injector starts to rise at the fuel-injection-start command timing "Is". A detection pressure detected by the fuel pressure sensor varies as shown by a solid line "L1" in FIG. 13B.

It should be noted that the command signal for starting a fuel injection is referred to as a SFC-signal and the command signal for ending a fuel injection is referred to as an EFC-signal, hereinafter.

When the SFC-signal is outputted from the ECU at the fuel-injection-start command timing "Is" and an injection rate (injection quantity per unit time) increases, the detection pressure starts to decrease at a changing point "P3a" on the pressure waveform.

A timing at which the changing point "P3a" appears is detected and the fuel-injection-start timing is computed based on its detection timing of the changing point "P3a". Specifically, as shown by a solid line M1 in FIG. 13C, differential values are computed with respect to every detection pressure. After the SFC-signal is outputted at the fuel-injection-start command timing "Is", the differential value first becomes lower than a threshold TH at a timing "t1". This timing "t1" is detected as the timing at which the changing point "P3a" appears.

It should be noted that when the fuel injection rate starts to decrease, the detection pressure starts to increase at a changing point "P7a". When the fuel injection rate becomes zero, an increase in the detection pressure ends at a changing point "P8a".

The pressure waveform illustrated by the solid line L1 in FIG. 13B represents a waveform in a case that a single fuel injection is performed during one combustion cycle. In a case that a multi-stage injection is performed, the pressure waveform generated by the second or successive fuel injection is illustrated by a broken line L2. This pressure waveform illustrated by the broken line L2 is generated by overlapping an aftermath (refer to an encircled portion "A0" in FIG. 13B) of the previous waveform with the current waveform.

As a result, the differential values shift from the solid line M1 to a dashed line M2. That is, the differential value becomes lower than the threshold TH at a timing "tx", and this timing "tx" which is earlier than the actual fuel-injection-start timing "t1" is erroneously detected as the fuel-injection-start timing.

Especially, in a case that a multi-stage injection is performed, when an interval between n-th injection and (n+1)th injection is short, the pressure waveform of n-th fuel injection encircled by the line A0 overlaps with the pressure waveform of (n+1)th fuel injection, which increase the pulsations of the pressure waveform and the deferential values. The erroneous detection frequently occurs.

Moreover, it is conceivable that noises overlapping on the pressure waveform may cause a deformation of the pressure waveform. Thus, even in a case that single-stage injection is performed or the interval between adjacent injections is long, the above mentioned erroneous detection of the actual fuel-injection-start timing may be performed.

SUMMARY OF THE INVENTION

The present invention is made in view of the above matters, and it is an object of the present invention to provide a fuel injection detecting device capable of detecting a fuel-injection-start timing with high accuracy based on a pressure waveform detected by a fuel pressure sensor.

According to the present invention, a fuel injection detecting device detecting a fuel injection condition is applied to a fuel injection system in which a fuel injector injects a fuel accumulated in an accumulator. The fuel injection detecting device includes a fuel pressure sensor provided in a fuel passage fluidly connecting the accumulator and a fuel injection port of the fuel injector. The fuel pressure sensor detects a fuel pressure which varies due to a fuel injection from the fuel injection port. Further, the fuel injection detection device computes an actual fuel-injection-start timing based on a falling waveform of the fuel pressure during a period in which the fuel pressure decrease due to a fuel injection rate increase.

A falling pressure waveform encircled by an alternate long and short dash line A1 in FIG. 13B hardly receives disturbances and its shape is stable. Further, the falling waveform has high correlationship with the fuel-injection-start timing. According to the present invention, since the fuel-injection-start timing is computed based on the falling waveform, the fuel-injection-start timing can be accurately computed without any disturbances. Therefore, the fuel-injection-start timing can be computed with high accuracy.

According to another aspect of the invention, the falling waveform is modeled by a mathematical formula. The fuel-injection-start timing is computed based on this mathematical formula.

Further, the falling waveform has high correlationship with the fuel-injection-start timing. Thus, the fuel-injection-start timing can be easily computed with high accuracy based on the mathematical formula.

According to another aspect, the falling waveform is modeled by a straight line model. The fuel-injection-start timing is computed based on the straight line model.

According to the various experiments that the present inventors have conducted, it becomes apparent that the actual falling waveform is substantially a straight line. Comparing with a modeling of the waveform by a curved line, the modeling of the waveform by a straight line can reduce a computation load and a memory capacity.

Specifically, the falling waveform is modeled by a straight line model as follows.

A tangent line on a specified point of the falling waveform can be defined as the straight line model. At the specified point, the differential value of the falling waveform is a maximum value.

Alternatively, the falling waveform is modeled by a straight line model based on a plurality of specified points. In this case, a straight line passing through the specified points can be defined as the straight line model. Alternatively, a straight line in which a total distance between the straight line and the specified points is minimum value can be defined as the straight line model.

According to another aspect of the present invention, a fuel injection detecting device computes a reference pressure based on a fuel pressure right before a fuel pressure drop is generated due to a fuel injection. The fuel-injection-start timing is computed based on a timing at which a fuel pressure derived from a mathematical model formula is equal to the reference pressure.

By substituting the reference pressure into the mathematical model formula, the fuel-injection-start timing can be accurately computed.

According to another aspect of the present invention, an average fuel pressure during a specified period including a fuel-injection-start timing is set as the reference pressure.

There is a response delay between a timing at which a command signal for starting the fuel injection is outputted and a timing at which the actual fuel injection is started. According to the above aspect of the present invention, the reference pressure can be defined at a timing which is close to the actual fuel-injection-start timing as much as possible. Thus, the reference pressure can be set close to the actual fuel injection start pressure so that the fuel-injection-start timing can be accurately computed.

Furthermore, even if the waveform receives disturbance as shown by dashed line L2 in FIG. 13B, the reference pressure hardly receives the disturbance and the fuel-injection-start timing can be accurately computed.

According to another aspect of the present invention, a fuel injection detecting device is applied to a fuel injection system in which a multi-stage fuel injection is performed during one combustion cycle. A reference pressure is computed with respect to a first fuel injection. The fuel-injection-start timings of the second and successive fuel injections are computed based on the reference pressure which is computed with respect to the first fuel injection.

As shown by an alternate long and short dash line A0 in FIG. 13B, the pressure waveform after the changing point "P8a" is gradually attenuated. However, in a case that a multi-stage injection is performed, when an interval between n-th injection and (n+1)th injection is short, the pressure waveform illustrated by the line A0 of n-th fuel injection overlaps with the pressure waveform of (n+1)th fuel injection. Thus, the reference pressure of (n+1)th fuel injection can not be accurately computed.

According to the above aspect of the present invention, the fuel-injection-start timings of the second and successive fuel injections are computed based on the reference pressure of the first fuel injection. Since the reference pressure of the first injection is stable, the fuel-injection-start timing of the second and successive fuel injection can be accurately computed.

According to another aspect of the present invention, a pressure drop amount depending on a fuel injection amount of n-th (n≧2) fuel injection is subtracted from the reference pressure computed with respect to (n−1)th fuel injection, and this subtracted reference pressure is used as a new reference pressure for computing a fuel-injection-start timing of n-th fuel injection.

Thus, the reference pressure of n-th fuel injection can be set close to the actual fuel injection start pressure so that the fuel-injection-start timing of the n-th fuel injection can be accurately computed.

According to another aspect of the present invention, the reference pressure of n-th fuel injection is computed with reference to the reference pressure of (n−1)th fuel injection. Thus, the reference pressure of the second and successive fuel injections can be set close to the actual fuel injection start pressure, so that the fuel-injection-start timing can be accurately computed.

According to another aspect of the present invention, the fuel injector includes a high-pressure passage introducing the fuel toward an injection port; a needle valve for opening/closing the injection port; a backpressure chamber receiving the fuel from the high-pressure passage so as to apply a backpressure to the needle valve; and a control valve for controlling the backpressure by adjusting a fuel leak amount from the backpressure chamber. The reference pressure is computed based on a fuel pressure drop amount during a time period from when the control valve is opened until when the needle valve is opened.

Thus, the reference pressure can be set close to the actual fuel injection start pressure, so that the fuel-injection-start timing can be accurately computed.

BRIEF DESCRIPTION OF THE DRAWINGS

Other objects, features and advantages of the present invention will become more apparent from the following description made with reference to the accompanying drawings, in which like parts are designated by like reference numbers and in which:

FIGS. 5A to 5C are time charts showing a relationship between a waveform of detection pressure detected by the fuel pressure sensor and a waveform of injection rate in a case of a single-stage injection;

DETAILED DESCRIPTION OF EMBODIMENTS

Hereafter, embodiments of the present invention will be described.

[First Embodiment]

First, it is described about an internal combustion engine to which a fuel injection detecting device is applied. The internal combustion engine is a multi-cylinder four stroke diesel engine which directly injects high pressure fuel (for example, light oil of 1000 atmospheres) to a combustion chamber.

Figure 1:
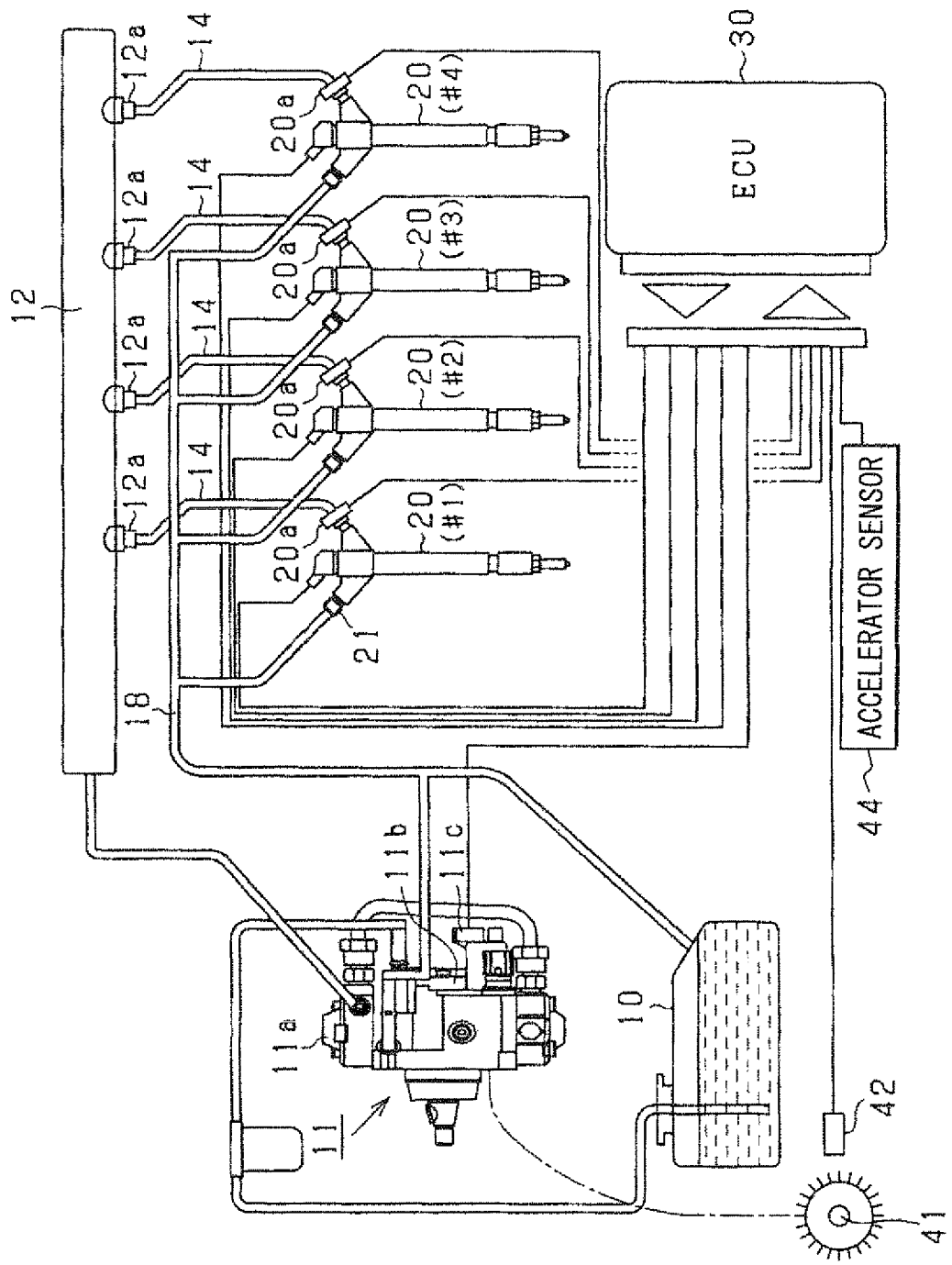
FIG. 1 is a construction diagram showing an outline of a fuel injection system on which a fuel injection detecting device is mounted, according to a first embodiment of the present invention.

FIG. 1 is a construction diagram showing an outline of a common rail fuel injection system according to an embodiment of the present invention. An electronic control unit (ECU) 30 feedback controls a fuel pressure in a common rail 12 in such a manner as to agree with a target fuel pressure. The fuel pressure in the common rail 12 is detected by a fuel pressure sensor 20a and controlled by adjusting an electric current supplied to a suction control valve 11c. Further, based on the fuel pressure, a fuel injection quantity of each cylinder and an output of the engine are controlled.

The various devices constructing the fuel supply system include a fuel tank 10, a fuel pump 11, the common rail 12, and injectors 20 which are arranged in this order from the upstream side of fuel flow. The fuel pump 11, which is driven by the engine, includes a high-pressure pump 11a and a low-pressure pump 11b. The low-pressure pump 11b suctions the fuel in the fuel tank 10, and the high-pressure pump 11a pressurizes the suctioned fuel. The quantity of fuel pressure-fed to the high-pressure pump 11a, that is, the quantity of fuel discharged from the fuel pump 11 is controlled by the suction control valve (SCV) 11c disposed on the fuel suction side of the fuel pump 11. That is, the fuel quantity discharged from the fuel pump 11 is controlled to a desired value by adjusting a driving current supplied to the SCV 11c.

The low-pressure pump 11b is a trochoid feed pump. The high-pressure pump 11a is a plunger pump having three plungers. Each plunger is reciprocated in its axial direction by an eccentric cam (not shown) to pump the fuel in a pressuring chamber at specified timing sequentially.

The pressurized fuel by the fuel pump 11 is introduced into the common rail 12 to be accumulated therein. Then, the accumulated fuel is distributed to each injector 20 mounted in each cylinder #1-#4 through a high-pressure pipe 14. A fuel discharge port 21 of each injector 20 is connected to a low-pressure pipe 18 for returning excessive fuel to the fuel tank 10. Moreover, between the common-rail 12 and the high-pressure pipe 14, there is provided an orifice 12a (fuel pulsation reducing means) which attenuates pressure pulsation of the fuel which flows into the high-pressure pipe 14 from the common rail 12.

Figure 2:
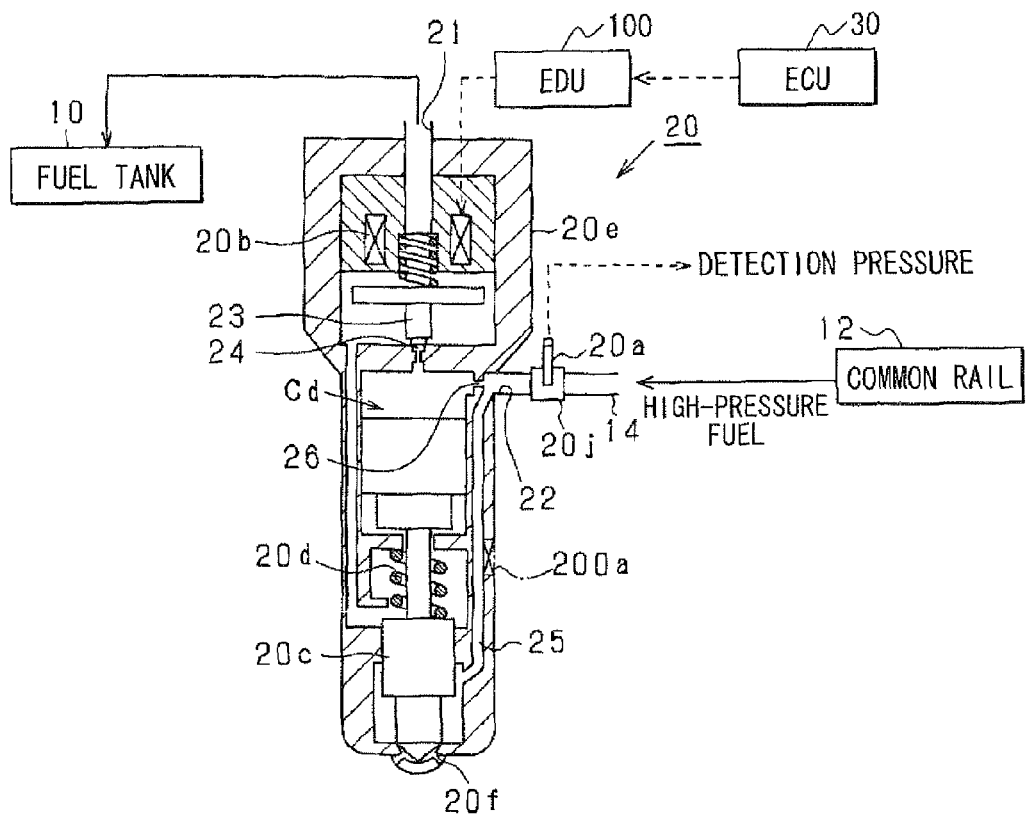
FIG. 2 is a cross-sectional view schematically showing an internal structure of an injector.

The structure of the injector 20 will be described in detail with reference to FIG. 2. The above four injectors 20(#1-#4) have fundamentally same structure. The injector 20 is a hydraulic injection valve using the fuel (fuel in the fuel tank 10), and a driving force for fuel injection is transferred to the valve portion through a backpressure chamber Cd. As shown in FIG. 2, the injector 20 is a normally-closed valve.

A housing 20e of the injector 20 has a fuel inlet 22 through which the fuel flows from the common rail 12. A part of the fuel flows into the backpressure chamber Cd through an inlet orifice 26 and the other flows toward a fuel injection port 20f. The backpressure chamber Cd is provided with a leak hole (orifice) 24 which is opened/closed by a control valve 23. When the leak hole 24 is opened, the fuel in the backpressure chamber Cd is returned to the fuel tank 10 through the leak hole 24 and a fuel discharge port 21.

When a solenoid 20b is energized, the control valve 23 is lifted up to open the leak hole 24. When the solenoid 20b is deenergized, the control valve 23 is lifted down to close the leak hole 24. According to the energization/deenergization of the solenoid 20b, the pressure in the backpressure chamber Cd is controlled. The pressure in the backpressure chamber Cd corresponds to a backpressure of a needle valve 20c. A needle valve 20c is lifted up or lifted down according to the pressure in the oil pressure chamber Cd, receiving a biasing force from a spring 20d. When the needle valve 20c is lifted up, the fuel flows through a high-pressure passage 25 and is injected into the combustion chamber through the injection port 20f.

The needle valve 20c is driven by an ON-OFF control. That is, when the ECU 30 outputs the SEC-signal to an electronic driver unit (EDU) 100, the EDU 100 supplies a driving current pulse to the solenoid 20b to lift up the control valve 23. When the solenoid 20b receives the driving current pulse, the control valve 23 and the needle valve 20c are lifted up so that the injection port 20f is opened. When the solenoid 20b receives no driving current pulse, the control valve 23 and the needle valve 20c are lifted down so that the injection port 201 is closed.

The pressure in the backpressure chamber Cd is increased by supplying the fuel in the common rail 12. On the other hand, the pressure in the backpressure chamber Cd is decreased by energizing the solenoid 20b to lift up the control valve 23 so that the leak hole 24 is opened. That is, the fuel pressure in the backpressure chamber Cd is adjusted by the control valve 23, whereby the operation of the needle valve 20c is controlled to open/close the fuel injection port 20f.

As described above, the injector 20 is provided with a needle valve 20c which opens/closes the fuel injection port 20f. When the solenoid 20b is deenergized, the needle valve 20c is moved to a closed-position by a biasing force of the spring 20d. When the solenoid 20b is energized, the needle valve 20c is moved to an open-position against the biasing force of the spring 20d.

A fuel pressure sensor 20a is disposed at a vicinity of the fuel inlet 22. Specifically, the fuel inlet 22 and the high-pressure pipe 14 are connected with each other by a connector 20j in which the fuel pressure sensor 20a is disposed. The fuel pressure sensor 20a detects fuel pressure at the fuel inlet 22 at any time. Specifically, the fuel pressure sensor 20a can detect a fuel pressure level (stable pressure), a fuel injection pressure, a variation in a waveform of the fuel pressure due to the fuel injection, and the like.

The fuel pressure sensor 20a is provided to each of the injectors 20. Based on the outputs of the fuel pressure sensor 20a, the variation in the waveform of the fuel pressure due to the fuel injection can be detected with high accuracy.

A microcomputer of the ECU 30 includes a central processing unit (CPU), a random access memory (RAM), a read only memory (ROM), an electrically erasable programmable read-only memory (EEPROM), a backup RAM, and the like. The ROM stores a various kind of programs for controlling the engine, and the EEPROM stores a various kind of data such as design date of the engine.

Moreover, the ECU 30 computes a rotational position of a crankshaft 41 and a rotational speed of the crankshaft 41, which corresponds to engine speed NE, based on detection signals from a crank angle sensor 42. A position of an accelerator is detected based on detection signals from an accelerator sensor 44. The ECU 30 detects the operating state of the engine and user's request on the basis of the detection signal of various sensors and operates various actuators such as the injector 20 and the SGV 11c.

Hereinafter, a control of fuel injection executed by the ECU 30 will be described.

The ECU 30 computes the fuel injection quantity according to an engine driving condition and the accelerator operation amount. The ECU 30 outputs the SFC-signal and the EFC-signal to the EDU 100. When the EDU 100 receives the SEC-signal, the EDU 100 supplies the driving current pulse to the injector 20. When the EDU 100 receives the EFC-signal, the EDU 100 stops a supply of the driving current pulse to the injector 20. The injector 20 injects the fuel according to the driving current pulse.

Figure 3:
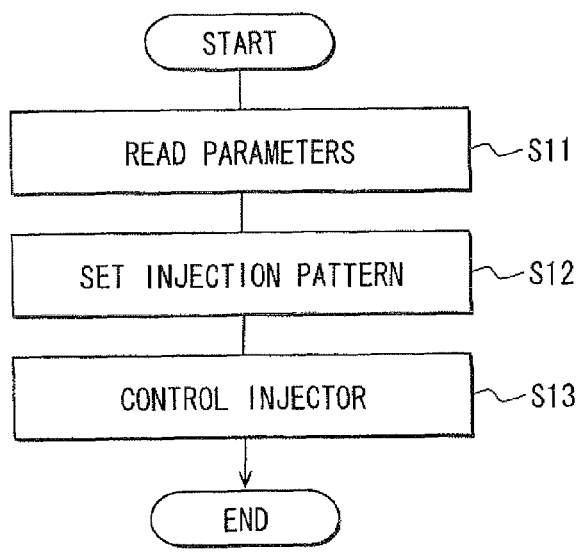
FIG. 3 is a flowchart showing a basic procedure of a fuel injection control.

Hereinafter, the basic procedure of the fuel injection control according to this embodiment will be described with reference to FIG. 3. The values of various parameters used in this processing shown in FIG. 3 are stored in the storage devices such as the RAM, the EEPROM, or the backup RAM mounted in the ECU 30 and are updated at any time as required.

In step S11, the computer reads specified parameters, such as the engine speed NE measured by the crank angle sensor 42, the fuel pressure detected by the fuel pressure sensor 20a, and the accelerator position detected by the accelerator sensor 44.

In step S12, the computer sets the injection pattern based on the parameters which are read in step S11. In a case of a single-stage injection, a fuel injection quantity (fuel injection period) is determined to generate the required torque on the crankshaft 41. In a case of a multi-stage injection, a total fuel injection quantity (total fuel injection period) is determined to generate the required torque on the crankshaft 41.

The injection pattern is obtained based on a specified map and a correction coefficient stored in the ROM. Specifically, an optimum injection pattern is obtained by an experiment with respect to the specified parameter. The optimum injection pattern is stored in an injection control map.

This injection pattern is determined by parameters such as a number of fuel injection per one combustion cycle, a fuel injection timing and fuel injection period of each fuel injection. The injection control map indicates a relationship between the parameters and the optimum injection pattern.

The injection pattern is corrected by the correction coefficient which is updated and stored in the EEPROM, and then the driving current pulse to the injector 20 is obtained according the corrected injection pattern. The correction coefficient is sequentially updated during the engine operation.

Then, the procedure proceeds to step S13. In step S13, the injector 20 is controlled based on the driving current pulse supplied from the EDU 100. Then, the procedure is terminated.

Figure 4:
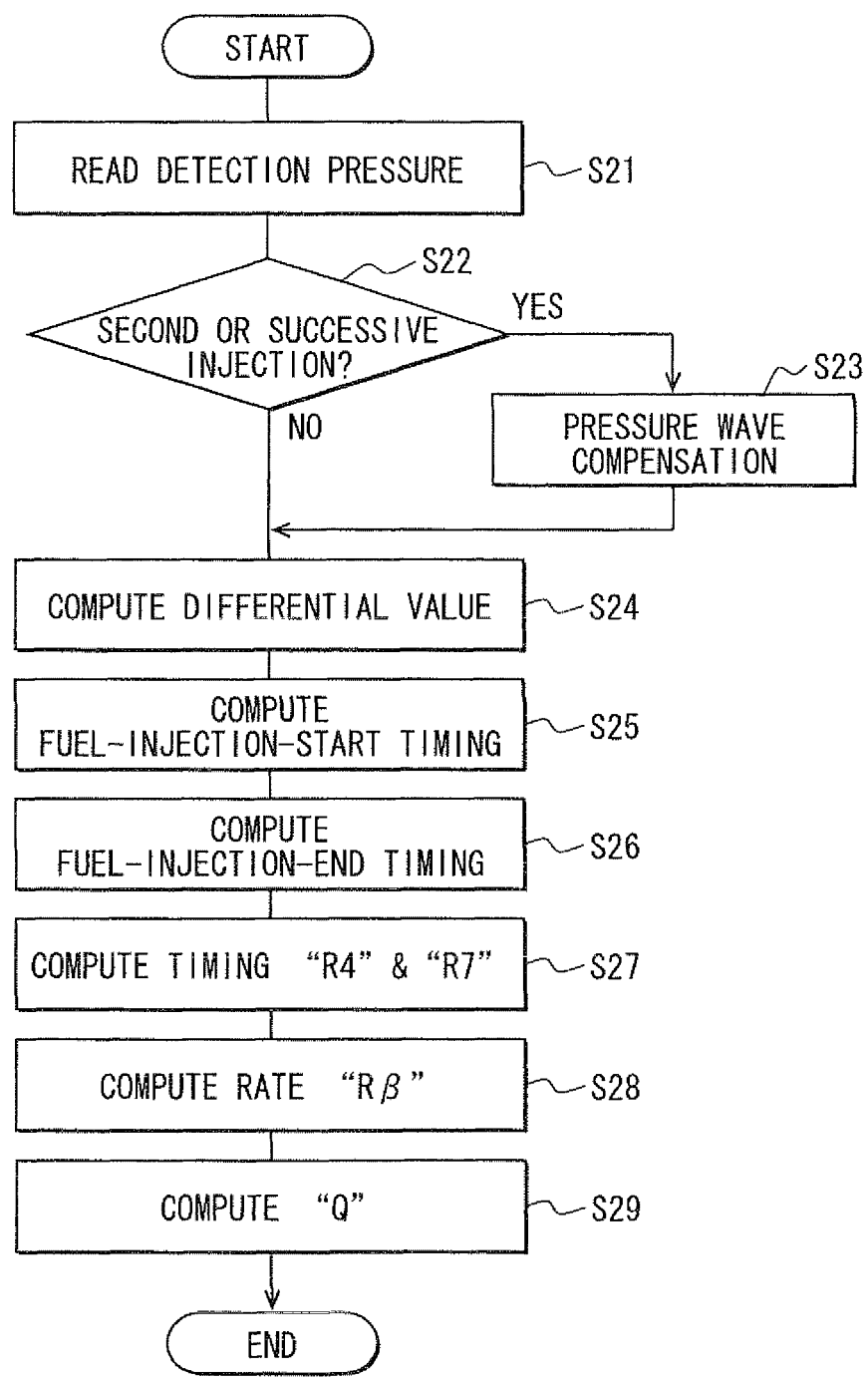
FIG. 4 is a flowchart showing a procedure for detecting a fuel injection condition based on a detection pressure detected by a fuel pressure sensor.

Referring to FIG. 4, a processing for detecting (computing) an actual fuel injection condition will be described.

The processing shown in FIG. 4 is performed at a specified cycle (for example, a computation cycle of the CPU) or at every specified crank angle. In step S21, an output value (detection pressure) of each fuel pressure sensor 20a is read. It is preferable that the output value is filtered to remove noises therefrom.

Referring to FIGS. 5A to 5C, the processing in step S21 will be described in detail.

FIG. 5A shows the driving current pulse which the injector 20 receives from the EDU 100 in step S13. When the driving current pulse is supplied to the injector 20, the solenoid 20b is energized to open the injection port 20f. That is, the ECU 30 outputs the SFC-signal to start the fuel injection at the fuel-injection-start command timing "Is", and the ECU 30 outputs the EFC-signal to stop the fuel injection at the fuel-injection-end command timing "Ie". During a time period "Tq" from the timing "Is" to the timing "Ie", the injection port 20f is opened. By controlling the time period "Tq", the fuel injection quantity "Q" is controlled. FIG. 5B shows a variation in fuel injection rate, and FIG. 5C shows a variation in detection pressure detected by the fuel pressure sensor 20a. It should be noted that FIGS. 5A to 5C show a case in which the injection port 20f is opened and close only once.

The ECU 30 detects the output value of the fuel pressure sensor 20a according to a sub-routine (not shown). In this sub-routine, the output value of the fuel pressure sensor 20a is detected at a short interval so that a pressure waveform can be drawn. Specifically, the sensor output is successively acquired at an interval shorter than 50 microsec (desirably 20 microsec).

Since the variation in the detection pressure detected by the fuel pressure sensor 20a and the variation in the injection rate have a relationship described below, a waveform of the injection rate can be estimated based on a waveform of the detection pressure.

After the solenoid 20b is energized at the fuel-injection-start command timing "Is" to start the fuel injection from the injection port 20f, the injection rate starts to increase at a changing point "R3" as shown in FIG. 5B. That is, an actual fuel injection is started. Then, the injection rate reaches the maximum injection rate at a changing point "R4". In other wards, the needle valve 20c starts to be lifted up at the changing point "R3" and the lift-up amount of the needle valve 20c becomes maximum at the changing point "R4".

It should be noted that the "changing point" is defined as follows in the present application. That is, a second order differential of the injection rate (or a second order differential of the detection pressure detected by the fuel pressure sensor 20a) is computed. The changing point corresponds to an extreme value in a waveform representing a variation in the second order differential. That is, the changing point of the injection rate (detection pressure) corresponds to an inflection point in a waveform representing the second order differential of the injection rate (detection pressure).

Then, after the solenoid 20b is deenergized at the fuel-injection-end command timing "Ie", the injection rate starts to decrease at a changing point "R7". Then, the injection rate becomes zero at a changing point "R8" and the actual fuel injection is terminated. In other wards, the needle valve 20c starts to be lifted down at the changing point "R7" and the injection port 20f is sealed by the needle valve 20c at the changing point "R8".

Referring to FIG. 5C, a variation in the detection pressure detected by the fuel pressure sensor 20a will be described. Before the fuel-injection-start command timing "Is", the detection pressure is denoted by "P0". After the driving current pulse is applied to the solenoid 20b, the detection pressure starts to decrease at a changing point "P1" before the injection rate start to increase at the changing point "R3". This is because the control valve 23 opens the leak hole 24 and the pressure in the backpressure chamber Cd is decreased at the changing point "P1". When the pressure in the backpressure chamber Cd is decreased enough, the pressure drop is stopped at a changing point "P2". It is due to that the leak hole 24 is fully opened and the leak quantity becomes constant, depending on an inner diameter of the leak hole 24.

Then, when the injection rate starts to increase at the changing point "R3", the detection pressure starts to decrease at a changing point "P3". When the injection rate reaches the maximum injection rate at a changing point "R4", the detection pressure drop is stopped at a changing point "P4". It should be noted that the pressure drop amount from the changing point "P3" to the changing point "P4" is greater than that from the changing point "P1" to the changing point "P2".

Then, the detection pressure starts to increase at a changing point "P5". It is due to that the control valve 23 seals the leak hole 24 and the pressure in the backpressure chamber Cd is increased at the point "P5". When the pressure in the backpressure chamber Cd is increased enough, an increase in the detection pressure is stopped at a changing point "P6".

When the injection rate starts to decrease at a changing point "R7", the detection pressure starts to increase at a changing point "P7". Then, when the injection rate becomes zero and the actual fuel injection is terminated at a changing point "R8", the increase in the detection pressure is stopped at a changing point "P8". It should be noted that the pressure increase amount from the changing point "P7" to the changing point "P8" is greater than that from the changing point "P5" to the changing point "P6". After the changing point "P8", the detection pressure is attenuated at a specified period T10.

As described above, by detecting the changing points "P3", "P4", "P7" and "P8" in the detection pressure, the starting point "R3" of the injection rate increase (an actual fuel-injection-start timing), the maximum injection rate point "R4", the starting point "R7" of the injection rate decrease, and the ending point "R8" of the injection rate decrease (the actual fuel-injection-end timing) can be estimated. Based on a relationship between the variation in the detection pressure and the variation in the injection rate, which will be described below, the variation in the injection rate can be estimated from the variation in the detection pressure.

That is, a decreasing rate "Pα" of the detection pressure from the changing point "P3" to the changing point "P4" has a correlation with an increasing rate "Rα" of the injection rate from the changing point "R3" to the changing point "R4". An increasing rate "Pγ" of the detection pressure from the changing point "P7" to the changing point "P8" has a correlation with a decreasing rate "Rγ" of the injection rate from the changing point "R7" to the point "R8". A decreasing amount "Pβ" of the detection pressure from the changing point "P3" to the changing point "P4" (maximum pressure drop amount "Pβ") has a correlation with a increasing amount "Rβ" of the injection rate from the changing point "R3" to the changing point "R4" (maximum injection rate "Rβ"). Therefore, the increasing rate "Rα" of the injection rate, the decreasing rate "Rγ" of the injection rate, and the maximum injection rate "Rβ" can be estimated by detecting the decreasing rate "Pα" of the detection pressure, the increasing rate "Pγ" of the detection pressure, and the maximum pressure drop amount "Pβ" of the detection pressure. The variation in the injection rate (variation waveform) shown in FIG. 5B can be estimated by estimating the changing points "R3", "R4", "R7", "R8", the increasing rate "Rα" of the injection rate, the maximum injection rate "Rβ" and the decreasing rate "Rγ" of the injection rate.

Furthermore, a value of integral "S" of the injection rate from the actual fuel-injection start-timing to the actual fuel-injection-end timing (shaded area in FIG. 5B) is equivalent to the injection quantity "Q". A value of integral of the detection pressure from the actual fuel-injection-start timing to the actual fuel-injection-end timing has a correlation with the value of integral "S" of the injection rate. Thus, the value of integral "S" of the injection rate, which corresponds to the injection quantity "Q", can be estimated by computing the value of integral of detection pressure detected by the fuel pressure sensor 20a. As described above, the fuel pressure sensor 20a can be operated as an injection quantity sensor which detects a physical quantity relating to the fuel injection quantity.

Referring back to FIG. 4, in step S22, the computer determines whether the current fuel injection is the second or the successive fuel injection. When the answer is Yes in step S22, the procedure proceeds to step S23 in which a pressure wave compensation process is performed with respect to the waveform of detection pressure obtained in step S21. The pressure wave compensation process will be described hereinafter.

FIGS. 6A, 7A, 8A and 9A are timing chart showing driving current pulses to the injector 20. FIGS. 6B, 7B, 8B, and 9B are timing chart showing waveforms of detection pressure.

In a case that the multi-stage injection is performed, following matters should be noted. The pressure waveform generated by n-th (n≧2) fuel injection is overlapped with the pressure waveform generated after the m-th (n>m) fuel injection is terminated. This overlapping pressure waveform generated after m-th fuel injection is terminated is encircled by an alternate long and short dash line Pe in FIG. 5C. In the present embodiment, m-th fuel injection is the first fuel injection.

Figure 6A:
FIGS. 6A and 6B are time charts showing a fuel injection characteristic according to the first embodiment.
Figure 6B:

More specifically, in a case that two fuel injections are performed during one combustion cycle, the driving current pulse are generated as indicated by a solid line L2a in FIG. 6A and the pressure waveform is generated as indicated by a solid line L2b in FIG. 6B. At a vicinity of fuel injection start timing of the latter fuel injection, the pressure waveform generated by the former fuel injection (first fuel injection) interferes with the pressure waveform generated by the latter fuel injection (second fuel injection). It is hard to recognize the pressure waveform which is generated by only the latter fuel injection.

Figure 7A:
FIGS. 7A and 7B are time charts showing a fuel injection characteristic according to the first embodiment.
Figure 7B:
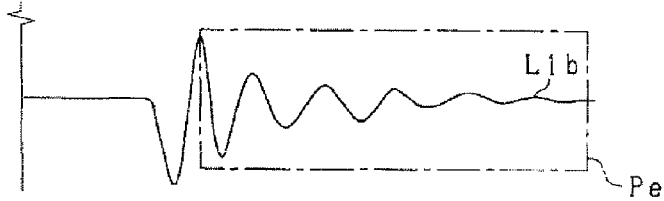
Figure 8A:
FIGS. 8A and 8B are time charts showing a fuel injection characteristic according to the first embodiment, wherein solid lines show waveforms shown in FIGS. 6A and 6B and dashed lines show waveforms shown in FIGS. 7A and 7B.
Figure 8B:
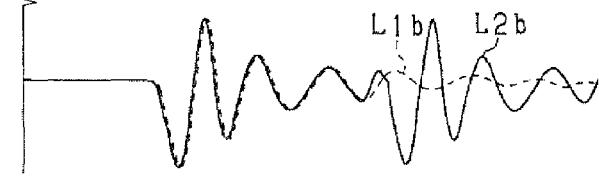
Figure 9A:
FIGS. 9A and 9B are time charts showing waveforms which are obtained by subtracting the waveforms shown in FIGS. 7A and 7B from waveforms shown in FIGS. 6A and 6B.
Figure 9B:
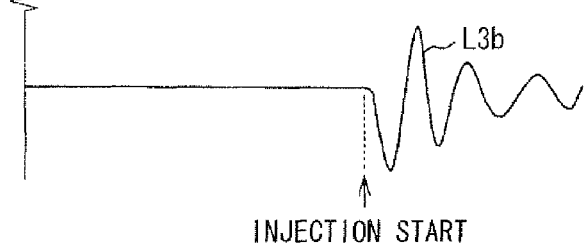

In a case that a single fuel injection (first fuel injection) is performed during one combustion cycle, the driving current pulse is generated as indicated by a solid line L1a in FIG. 7A and the pressure waveform is generated as indicated by a solid line L1b in FIG. 7B. FIGS. 8A and 8B are time charts in which the timing charts (solid lines L2a, L2b) shown in FIGS. 6A and 6B and the timing charts (dashed lines L1a, L1b) shown in FIGS. 7A and 7B are overlapped with each other. Then, a driving current pulse L1a and a pressure waveform L3b generated by only the latter fuel injection (second fuel injection), which are shown in FIGS. 9A and 9B, can be obtained by subtracting the driving current pulse L1a and the pressure waveform L1b from the driving current pulse L2a and the pressure waveform L2b respectively.

The above described process in which the pressure waveform L1b is subtracted from the pressure waveform L2b to obtain the pressure waveform L3b is performed in step S23. Such a process is referred to as the pressure wave compensation process.

Figure 10A:
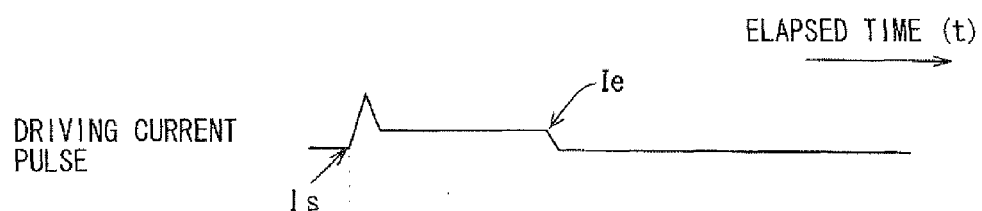
FIGS. 10A to 10C are time charts for explaining a computing method of the fuel-injection-end timing.
Figure 10B:
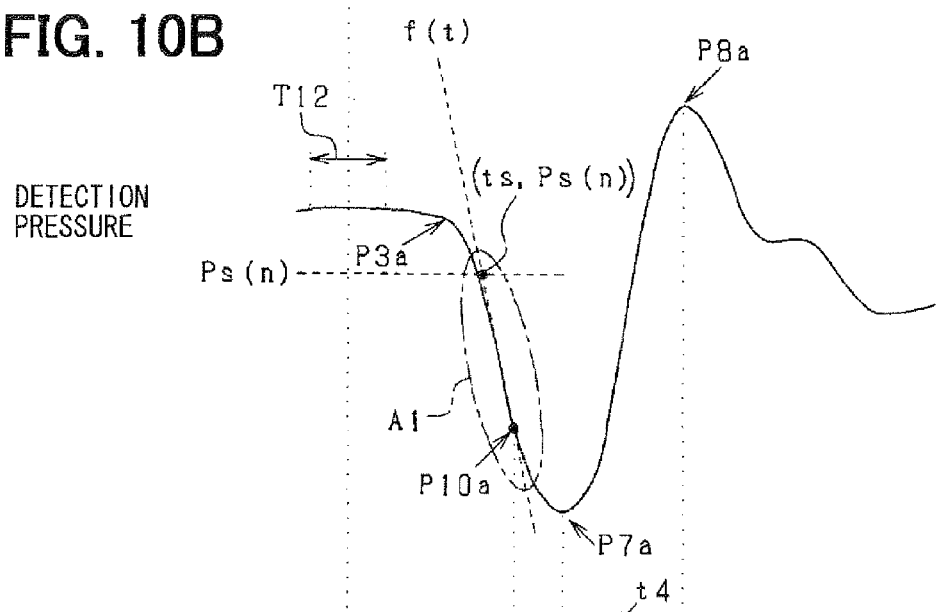
Figure 10C:
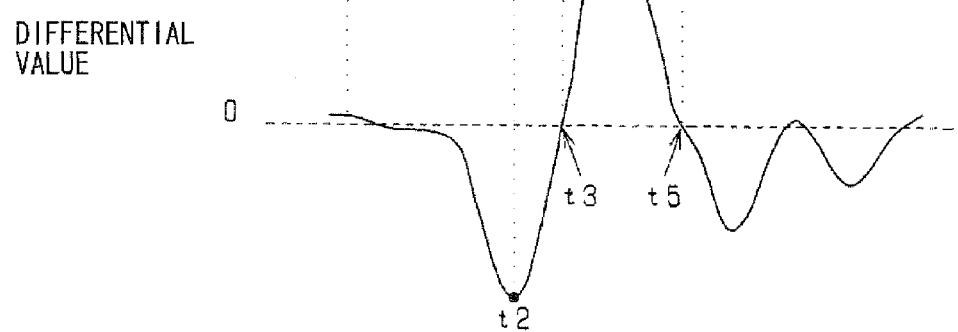

In step S24, the detection pressure (pressure waveform) is differentiated to obtain a waveform of differential value of the detection pressure, which is shown in FIG. 10C.

FIG. 10A shows a driving current pulse in which the SFC-signal is outputted at the fuel-injection-start command timing "Is". FIG. 10B shows a waveform of the detection pressure detected by the fuel pressure sensor 20a.

It should be noted that the fuel injection quantity in a case shown in FIGS. 10A to 10C is smaller than that in a case shown in FIGS. 5A to 5B. The pressure waveform shown in FIG. 10B is illustrated by a broken line in FIG. 5C. Thus, the changing points "P4", "P5", "P6" shown in FIG. 5C do not appear in FIG. 10B. Furthermore, FIG. 10B shows the waveform of the detection pressure in which the pressure wave compensation process and the filtering processes have been already performed. Thus, the changing points "P1" and "P2" shown in FIG. 5C are disappeared in FIG. 10B.

A changing point "P3a" in FIG. 10B corresponds to the changing point "P3" in FIG. 5C. At the changing point "P3a", the detection pressure starts to decrease due to the injection rate increase. A changing point "P7a" in FIG. 106 corresponds to the changing point "P7" in FIG. 5C. At the changing point "P7a", the detection pressure starts to increase due to the injection rate decrease. A changing point "P8a" in FIG. 108 corresponds to the changing point "P8" in FIG. 5C. At the changing point "P8a", the detection pressure increase is terminated due to the termination of the fuel injection.

FIG. 10C shows a waveform of differential value of the detection pressure in a case that the fuel injection quantity is small.

Referring back to FIG. 4, in steps S25 to S28, the various injection condition values shown in FIG. 5B are computed based on the differential value of the detection pressure obtained in step S24. That is, a fuel-injection-start timing "R3" is computed in step S25, a fuel-injection-end timing "R8" is computed in step S26, a maximum-injection-rate-reach timing "R4" and an injection-rate-decrease-start timing "R7" are computed in step S27, and the maximum injection rate "Rβ" is computed in step S28. In a case that the fuel injection quantity is small, the maximum-injection-rate-reach timing "R4" may agree with the injection-rate-decrease-start timing "R7".

In step S29, the computer computes the value of integral "S" of the injection rate from the actual fuel-injection-start timing to the actual fuel-injection-end timing based on the above injection condition values "R3", "R8", "Rβ", "R4", "R7". The value of integral "S" is defined as the fuel injection quantity "Q".

It should be noted that the value of integral "S" (fuel injection quantity "Q") may be computed based on the increasing rate "Rα" of the injection rate and the decreasing rate "Rγ" of the injection rate in addition to the above injection condition values "R3" "R8", "Rβ" "R4" "R7".

Referring to FIG. 10, the computing processes in steps S26-S28 will be described hereinafter.

When computing the fuel-injection-end timing "R8" in step S26, the computer detects a timing "t5" at which the differential value computed in step S24 becomes zero after the fuel-injection-start command timing "Is" and the timing "t4" at which the differential value is maximum value. This timing "t5" is defined as a timing corresponding to the changing point "P8a".

It should be noted that since the fuel in the fuel injector flows toward the injection ports 20f by its inertia, the timing "t5" at which the changing point "P8a" appears is delayed by a specified time period T11 than an actual fuel-injection-end timing. Also, a time period during which the pressure variation is propagated from the injection port 20f to the pressure sensor 20a will cause such a time delay. In view of this point, the specified time period T11 is subtracted from the timing "t5" to compute an fuel-injection-end timing "R8".

When computing the maximum-injection-rate-reach timing R4 (=the injection-rate-decrease-start timing R7) in step S27, the computer detects a timing "t3" at which the differential value computed in step S24 becomes zero after the fuel-injection-start command timing "Is" and a timing "t2" at which the differential value is a minimum value. This timing "t3" is defined as a timing corresponding to the changing point "P7a".

It should be noted that a specified time delay is subtracted from the timing "t3" to obtain a timing corresponding to the maximum-injection-rate-reach timing "R4" (=the injection-rate-decrease-start timing R7).

When computing the maximum injection rate "Rβ" in step S28, the computer computes a difference between the detection pressure at the timing "t3" and a reference pressure Ps(n) as the maximum pressure drop amount "Pβ". The maximum pressure drop amount "Pβ" is multiplied by a proportional constant to obtain the maximum injection rate "Rβ".

Referring to FIGS. 10A to 10C and 11, the computing process of the fuel-injection-start timing "R3" in step S25 will be described in detail.

Figure 11:
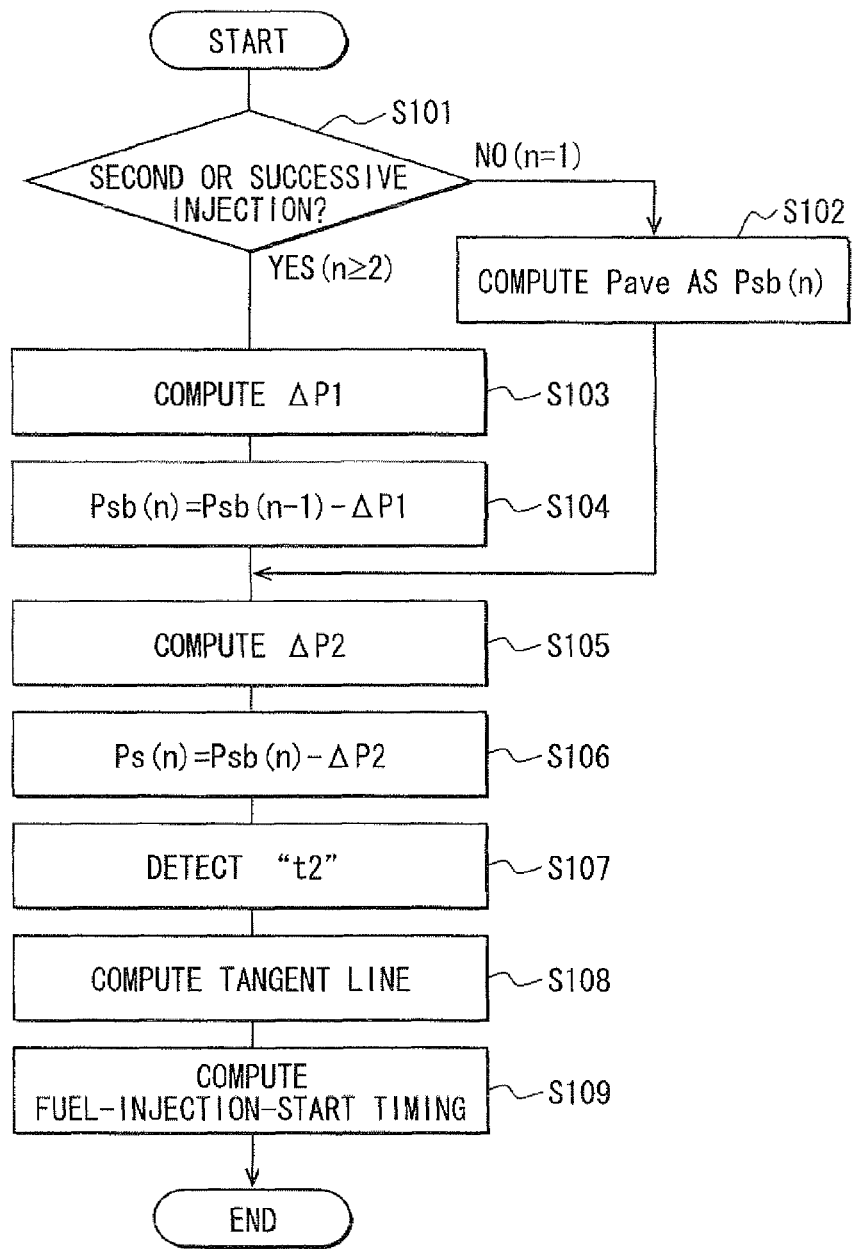
FIG. 11 is a flowchart showing a processing for computing the fuel-injection-start timing.

FIG. 11 is a flow chart which shows the details of the procedure in step S25. In steps S101 to S106, the reference pressure Ps(n) is computed according to the number of injection stages. It should be noted that the above "n" represents the number of injection stages in the multi-stage injection.

In step S101, the computer determines whether the current fuel injection is the second or the successive fuel injection. When the answer is No in step S101, that is, when the current fuel injection is the first injection, the procedure proceeds to step S102 in which an average pressure Pave of the detection pressure during a specified time period T12 is computed, and the average pressure Pave is set to a reference pressure base value Psb(n). This process in step S102 corresponds to a reference pressure computing means in the present invention. The specified time period T12 is defined in such a manner as to include the fuel-injection-start command timing "Is".

When the answer is Yes in step S101, that is, when the current fuel injection is the second or successive fuel injection, the procedure proceeds to step S103 in which a first pressure drop amount ΔP1 (refer to FIG. 5C) is computed. This first pressure drop amount ΔP1 depends on the fuel injection quantity of the previous fuel injection. This fuel injection quantity of the previous fuel injection is computed in step S29 or computed based on a time period from the timing "Is" to the timing "Ie". A map correlating the fuel injection quantity "Q" and the first pressure drop amount ΔP1 is previously stored in the ECU 30. The first pressure drop amount ΔP1 can be derived from this map.

Referring to FIG. 5C, the first pressure drop amount ΔP1 will be described in detail. As described above, the detection pressure after the changing point "P8" is attenuated at a specified cycle T10 to converge on a convergent value Pu(n). This convergent value Pu(n) is an injection start pressure of the successive fuel injection. In a case that the interval between (n−1)th fuel injection and n-th fuel injection is short, the convergent value Pu(n) of the n-th fuel injection is smaller than the convergent value Pu(n−1) of the (n−1)th fuel injection. This difference between Pu(n) and Pu(n−1) corresponds to the first pressure drop amount ΔP1 which depends on the fuel injection quantity of the (n−1)th fuel injection. That is, as the fuel injection quantity of the (n−1)th fuel injection is larger, the first pressure drop amount ΔP1 becomes larger and the convergent value Pu(n) becomes smaller.

In step S104, the first pressure drop amount ΔP1 is subtracted from the reference pressure base value Psb(n−1) to substitute Psb(n) for Psb(n−1).

For example, in a case that the second fuel injection is detected, the first pressure drop amount ΔP1 is subtracted from the reference pressure base value Psb(1) computed in step S102 to obtain the reference pressure base value Psb(2). In a case that the interval between (n−1)th fuel injection and n-th fuel injection is sufficiently long, since the first pressure drop amount ΔP1 comes close to zero, the convergent value Pu(n−1) is substantially equal to the reference pressure base value Psb(n).

In step S105, a second pressure drop amount ΔP2 (refer to FIG. 5C) is computed. This second pressure drop ΔP2 is generated due to a fuel leak from the leak hole 24.

Referring to FIG. 5C, the second pressure drop ΔP2 will be described in detail. After the control valve 23 is unseated according to the SFC-signal, when the sufficient amount of fuel flows out from the backpressure chamber Cd through the leak hole 24 to decrease the backpressure, the needle valve 20c starts to open the injection port 20f and the actual fuel injection is started. Thus, during a period after the control valve 23 is opened until the needle valve 20c is opened, the detection pressure decreases due to the fuel leak through the leak hole 24 even though the actual fuel injection has not been performed yet. This detection pressure drop corresponds to the second pressure drop ΔP2. The second pressure drop ΔP2 may be a constant value which is previously determined. Alternatively, the second pressure drop ΔP2 may be set according to the average pressure Pave computed in step S102. That is, as the average pressure Pave is larger, the second pressure drop ΔP2 is set larger.

In step S106, the second pressure drop amount ΔP2 computed in step S105 1 is subtracted from the reference pressure base value Psb(n) computed in step S102 or S104 to obtain the reference pressure Ps(n). As described above, according to the processes in steps S101 to S106, the reference pressure Ps(n) is computed according to the number of the injection-stage.

In steps S107 and S108, the pressure waveform in which the detection pressure is decreasing is modeled by a formula. This pressure falling waveform is encircled by an alternate long and short dash line A1 in FIG. 10B. The processes in steps S107 and S108 correspond to a modeling means in the present invention.

Referring to FIG. 10C, in step S107, the computer detects a timing "t2" at which the differential value computed in step S24 becomes minimum after the fuel-injection-start command timing "Is".

In step S108, a tangent line at the timing "t2" is expressed by a function f(t) of an elapsed time "t". This function f(t) corresponds to a modeling formula. This function f (t) is a linear function, which is shown by a dot-line f(t) in FIG. 10B.

In step S109, the fuel-injection-start timing "R3" is computed based on the reference pressure Ps(n) computed in step S106 and the modeling function f(t) obtained in step S108. The process in step S109 corresponds to a fuel-injection-start-timing computing means.

Specifically, the reference pressure Ps(n) is substituted into the modeling function f(t), whereby a timing "t" is obtained as the fuel-injection-start timing "R3". That is, the reference pressure Ps (n) is expressed by a horizontal dot-line in FIG. 10B, and a timing "ts" of an intersection between the reference pressure Ps(n) and the modeling function f(t) is computed as the fuel-injection-start timing "R3".

The above explanation of the flowchart shown in FIG. 11 is made referring to FIGS. 10A to 10C showing a case that the fuel injection quantity is small and the changing points "P4", "P5", "P6" do not appear. However, the processing shown in FIG. 11 can be similarly applied to a case that the fuel injection quantity is large and the changing points "P4", "P5", "P6" appear as shown in FIGS. 5A to 5C. That is, the fuel-injection-start timing "R3" can be computed based on the pressure waveform from the changing point "P3" to the changing point "P4" of the detection pressure in FIG. 5C.

The various fuel injection condition "R3", "R8", "Rβ", "R4", "R7" computed in steps S25 to S28 and the actual fuel injection quantity "Q" computed in step S29 are used for updating the map which is used in step S11. Thus, the map can be suitably updated according to an individual difference and deterioration with age of the fuel injector 20.

According to the present embodiment described above, following advantages can be obtained.

(1) The pressure waveform encircled by the alternate long and short dash line A1 in FIG. 10B, which will be referred to as a falling waveform A1, hardly receives disturbances and its shape is stable. That is, the slope and the intercept of the modeling function f(t) hardly receive disturbances and are constant values correlating to the fuel-injection-start timing "R3". Therefore, according to the present embodiment, the fuel-injection-start timing "R3" can be computed with high accuracy.

(2) The tangent line on the falling waveform A1 at the timing "t2" is computed as the modeling function f(t). Since the falling waveform A1 hardly receives disturbances, as long as the timing "t2" appears in a range of the falling waveform A1, the modeling function f(t) does not vary by large amount even if the timing "t2" is dispersed. Therefore, the fuel-injection-start timing "R3" can be computed with high accuracy.

Figure 13A:
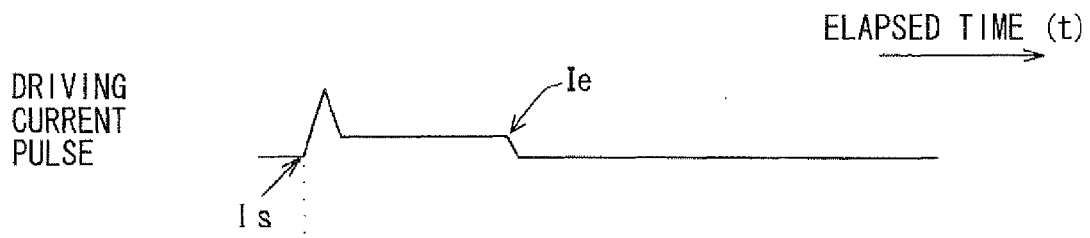
FIGS. 13A to 13C are time charts for explaining conventional computing method of the fuel-injection-start timing.
Figure 13B:
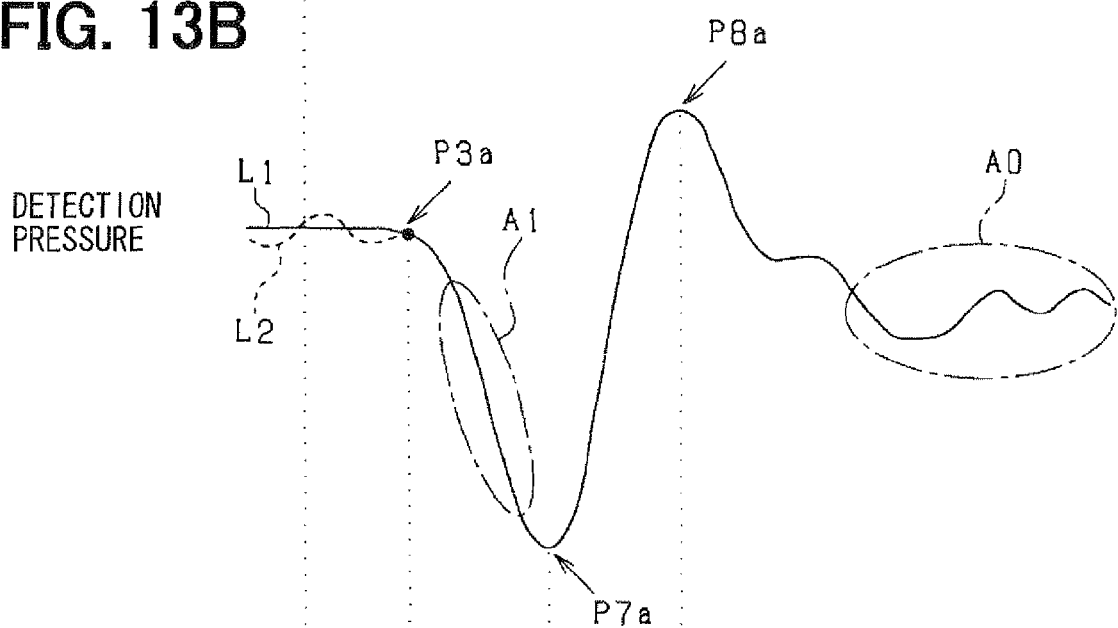
Figure 13C:
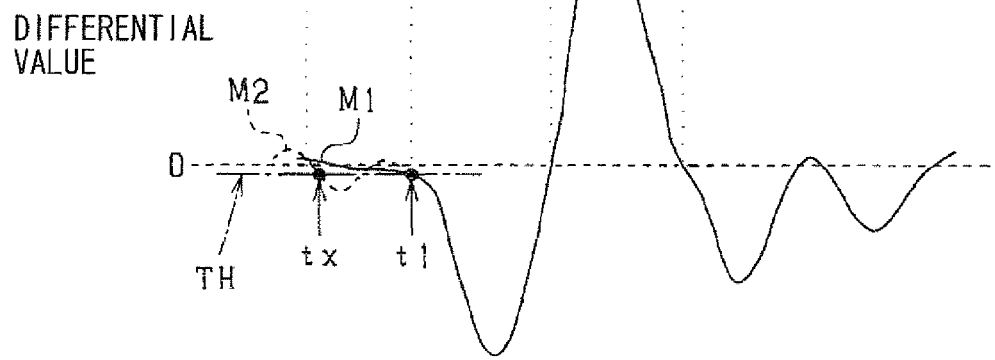

(3) Since the reference pressure Ps(n) is computed based on the average pressure Pave, even if the pressure waveform is disturbed as shown by a broken line L2 in FIG. 13B, the reference pressure Ps(n) hardly receives the disturbance so that the fuel-injection-start timing "R3" can be computed with high accuracy.

(4) Since reference pressure base value Psb(n) of the second and successive fuel injection is computed based on the average pressure Pave (reference pressure base value Psb(1)) of the first fuel injection, the reference pressure base value Psb(n) of the second or successive fuel injection can be accurately computed even if the average pressure Pave of the second or successive fuel injection can not be accurately computed. Thus, even if the interval between adjacent fuel injections is short, the fuel-injection-start timing "R3" of the second and successive fuel injection can be accurately computed.

(5) The first pressure drop amount ΔPI due to the previous fuel injection is subtracted from the reference pressure base value Psb(n−1) of the previous fuel injection to obtain the reference pressure base value Psb(n) of the current fuel injection. That is, when the reference pressure base value Psb(n) of the second and successive fuel injection is computed based on the average pressure Pave of the first fuel injection, the reference pressure base value Psb(n) is computed based on the first pressure drop amount ΔPI. Thus, the reference pressure Ps(n) can be set close to the actual fuel-injection-start pressure so that the fuel-injection-start timing "R3" of the second and successive fuel injection can be accurately computed.

(6) The second pressure drop amount ΔP2 due to the fuel leak is subtracted from the reference pressure base value Psb(n) to obtain the reference pressure Ps(n) of the current fuel injection. Thus, the reference pressure Ps(n) can be set close to the actual fuel-injection-start pressure so that the fuel-injection-start timing "R3" can be accurately computed.

[Second Embodiment]

Figure 12A:
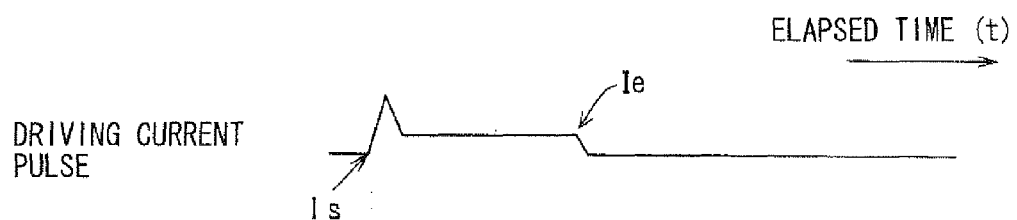
FIGS. 12A to 12C are time charts for explaining a computing method of the fuel-injection-start timing, according to a second embodiment of the present invention.
Figure 12B:
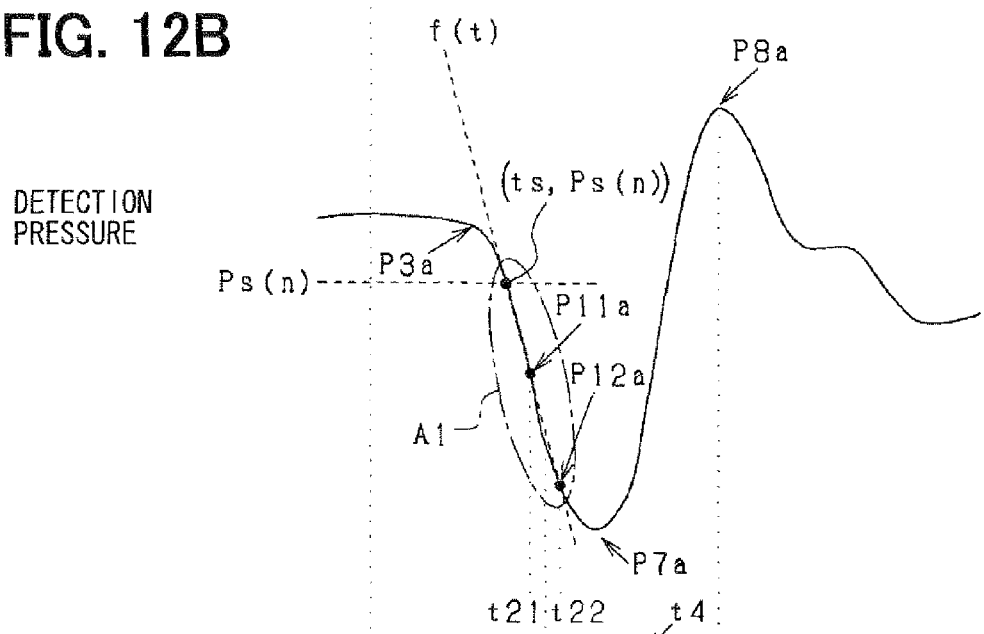
Figure 12C:
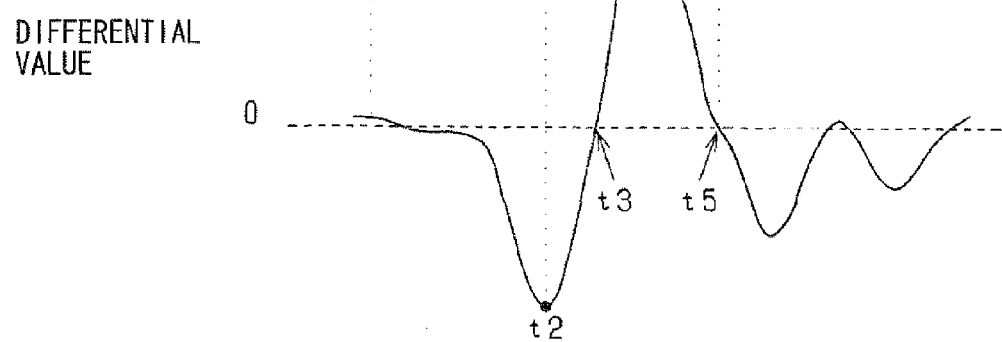

In the above first embodiment, the tangent line at the timing "t2" is defined as the modeling function f(t). In a second embodiment, as shown in FIG. 12, a straight line passing through specified two points "P11a", "P12a" is defined as the modeling function f(t). A dashed line representing the modeling function f(t) crosses a dashed line representing the reference pressure Ps(n) at a point of a timing "ts". This timing "ts" is defined as the fuel-injection-start timing "R3".

It should be noted that the specific two points "P11a", "P12a" represent the detection pressure on the falling waveform A1 at timings "t21" and "t22" which are respectively before and after the timing "t2".

According to the second embodiment, the same advantages as the first embodiment can be achieved. Moreover, as a modification of the second embodiment, three or more specific points are defined on the falling waveform A1, and the modeling function f(t) can be computed by least-square method in such a manner that a total distance between the specific points and the modeling function f(t) becomes minimum.

[Other Embodiment]

The present invention is not limited to the embodiments described above, but may be performed, for example, in the following manner. Further, the characteristic configuration of each embodiment can be combined.

The modeling function f(t) may be high-dimensional function. The falling waveform A1 can be modeled by a curved line.

The falling waveform can be modeled by a plurality of straight lines. In this case, different functions f (t) for every range of time will be used.

The reference pressure base value Psb(1) can be used as the reference pressure base value Psb(n≧2).

The fuel-injection-start timing "R3" can be computed based on the specified two points "P11a", "P12a" on the falling waveform A1 without computing the modeling function f(t).

The first pressure loss amount ΔP1 due to the second and successive fuel injection can be computed based on the average pressure Pave (reference pressure base value Psb(1)) of the first fuel injection. If the first pressure loss amount ΔP1 is computed based on both the reference pressure base value Psb(1) and a fuel temperature, the reference pressure for computing the fuel-injection-start timing of the second and successive injection can be close to the actual fuel-injection-start timing with high accuracy.

The fuel pressure sensor 20a can be disposed in the housing 20e to detect the fuel pressure in the high-pressure passage 25, as indicated by a dashed line 200a in FIG. 2.

In a case that the fuel pressure sensor 20a is arranged close to the fuel inlet 22, the fuel pressure sensor 20a is easily mounted. In a case that the fuel pressure sensor 20a is disposed in the housing 20e, since the fuel pressure sensor 20a is close to the fuel injection port 20f, the variation in pressure at the fuel injection port 20f can be accurately detected.

A piezoelectric injector may be used in place of the electromagnetically driven injector shown in FIG. 2. The direct-acting piezoelectric injector causes no pressure leak through the leak hole and has no backpressure chamber so as to transmit a driving power. When the direct-acting injector is used, the injection rate can be easily controlled.

What is claimed is:

1. A fuel injection detecting device detecting a fuel injection condition, the fuel injection detecting device being applied to a fuel injection system in which a fuel injector injects a fuel accumulated in an accumulator and a multi-stage fuel injection is performed during one combustion cycle, the fuel injection detecting device comprising:

a fuel pressure sensor provided in a fuel passage fluidly connecting the accumulator and a fuel injection port of the fuel injector, the fuel pressure sensor configured to detect a fuel pressure which varies due to a fuel injection from the fuel injection port; and a processing system, comprising a computer processor, the processing system being configured to:

subtract a pressure waveform generated by a first fuel injection from a pressure waveform generated by a second or successive fuel injection and compute an actual fuel-injection-start timing based on a falling waveform of the fuel pressure during a period in which the fuel pressure decreases due to a fuel injection rate increase;

model the falling waveform by a mathematical formula and compute a reference pressure based on a fuel pressure right before a fuel pressure drop due to a fuel injection is generated;

compute the-fuel-injection-start timing based on timing at which a fuel pressure derived from the mathematical formula is equal to the reference pressure;

compute the reference pressure with respect to a first fuel injection; and subtract a pressure drop amount depending on a fuel infection amount of a previous fuel injection from the reference pressure computed with respect to the first fuel injection, the subtracted reference pressure being used as a new reference pressure for computing a fuel-injection-start timing of the second or successive fuel injection.

2. A fuel injection detecting device according to claim 1, the fuel injector including:

a high-pressure passage configured to introduce the fuel toward the injection port;

a needle valve for opening/closing the injection port;

a backpressure chamber configured to receive the fuel from the high-pressure passage so as to apply a backpressure to the needle valve; and a control valve for controlling the backpressure by adjusting a fuel leak amount from the backpressure chamber, and the processing system being further configured to compute the reference pressure with reference to a fuel pressure drop amount during a time period from when the control valve is opened until when the needle valve is opened.

3. A fuel injection detecting device according to claim 1, the processing system being further configured to model the falling waveform by a straight line model and compute the fuel-injection-start timing based on the straight line model.

4. A fuel injection detecting device according to claim 3, the modeling defining a tangent line at a specified point on the falling waveform as the straight line model.

5. A fuel injection detecting device according to claim 4, the modeling defining a point at which a differential value of the falling waveform is minimum as the specified point.

6. A fuel injection detecting device according to claim 3, the falling waveform being modeled by a straight line model based on a plurality of specified points on the falling waveform.

7. A fuel injection detecting device according to claim 6, the modeling defining a straight line passing through the specified points as the straight line model.

8. A fuel injection detecting device according to claim 6, the modeling defining a straight line as the straight line model, the straight line in which a total distance between the straight line and the specified points is minimum.

9. A fuel injection detecting device according to claim 1, the processing system being further configured to define a specified period including a fuel-injection-start timing and set an average fuel pressure during the specified period as the reference pressure.

10. A fuel injection detecting device according to claim 1, the pressure drop amount being computed based on the reference pressure computed with respect to the first fuel injection.

11. A fuel injection detecting device detecting a fuel injection condition, the fuel injection detecting device being applied to a fuel injection system in which a fuel injector injects a fuel accumulated in an accumulator and a multi-stage fuel injection is performed during one combustion cycle, the fuel injection detecting device comprising:
   a fuel pressure sensor provided in a fuel passage fluidly connecting the accumulator and a fuel injection port of the fuel injector, the fuel pressure sensor being configured to detect a fuel pressure which varies due to a fuel injection from the fuel injection port; and
   a processing system, comprising a computer processor, the processing system being configured to:
      subtract a pressure waveform generated by a first fuel injection from a pressure waveform generated by a second or successive fuel injection and compute an actual fuel-injection-start timing based on a falling waveform of the fuel pressure during a period in which the fuel pressure decreases due to a fuel injection rate increase; and
      model the falling waveform by a mathematical formula and compute a reference pressure based on a fuel pressure right before a fuel pressure drop due to a fuel injection is generated;
   the fuel injector including:
      a high-pressure passage configured to introduce the fuel toward the injection port;
      a needle valve for opening/closing the injection port;
      a backpressure chamber configured to receive the fuel from the high-pressure passage so as to apply a backpressure to the needle valve; and
      a control valve for controlling the backpressure by adjusting a fuel leak amount from the backpressure chamber, and
   the processing system being further configured to:
      compute the reference pressure with reference to a fuel pressure drop amount during a time period from when the control valve is opened until when the needle valve is opened;
      compute the reference pressure with respect to a first fuel injection; and
      subtract a pressure drop amount depending on a fuel injection amount of a previous fuel injection from the reference pressure computed with respect to the first fuel injection, the subtracted reference pressure being used as a new reference pressure for computing a fuel-injection-start timing of the second or successive fuel injection.

* * * * *